(12) United States Patent
Lang et al.

(10) Patent No.: US 10,788,381 B2
(45) Date of Patent: Sep. 29, 2020

(54) LOAD MEASUREMENT DEVICE AND METHOD FOR DETERMINING LOAD

(71) Applicant: Aktiebolaget SKF, Gothenburg (SE)

(72) Inventors: Defeng Lang, Delft (NL); Muhammaad Ahmer, Hisings Backa (SE); Frank de Wit, Noordeloos (NL)

(73) Assignee: Aktiebolaget SKF, Gothenburg (SE)

( * ) Notice: Subject to any disclaimer, the term of this patent is extended or adjusted under 35 U.S.C. 154(b) by 0 days.

(21) Appl. No.: 15/531,130

(22) PCT Filed: Nov. 23, 2015

(86) PCT No.: PCT/EP2015/077319
§ 371 (c)(1),
(2) Date: May 26, 2017

(87) PCT Pub. No.: WO2016/083285
PCT Pub. Date: Jun. 2, 2016

(65) Prior Publication Data
US 2017/0322095 A1    Nov. 9, 2017

(30) Foreign Application Priority Data
Nov. 27, 2014    (GB) .................................. 1421050.4

(51) Int. Cl.
*G01L 5/00* (2006.01)
*F16J 15/3296* (2016.01)
(Continued)

(52) U.S. Cl.
CPC ......... *G01L 5/0009* (2013.01); *F16J 15/3296* (2013.01); *G01L 1/005* (2013.01);
(Continued)

(58) Field of Classification Search
None
See application file for complete search history.

(56) References Cited

U.S. PATENT DOCUMENTS 4,748,850 A    6/1988    Kataoka
5,648,614 A    7/1997    Martsfeld
(Continued)

FOREIGN PATENT DOCUMENTS

CN    1094136 A    10/1994
CN    1380499 A    11/2002
(Continued)

OTHER PUBLICATIONS

Accelerometer and Friction, Endogan, (Year: 2010).

*Primary Examiner* — Peter J Macchiarolo
*Assistant Examiner* — Jermaine L Jenkins
(74) *Attorney, Agent, or Firm* — Garcia-Zamor Intellectual Property Law; Ruy Garcia-Zamor; Bryan Peckjian

(57) ABSTRACT

The invention relates to a load measuring device including a deformable component configured to be deformed under a load to be measured and a sensor assembly attached to a first portion of the deformable component and to a method for determining load using such a sensor assembly. It is proposed that the sensor assembly includes at least one acceleration sensor configured to detect a change in an orientation of the first portion with regard to the direction of gravity and that the deformable component is formed as a seal configured to be in sliding contact with a component configured to rotate in relation to the seal.

11 Claims, 2 Drawing Sheets

(51) Int. Cl.
*G01P 15/18* (2013.01)
*G01L 1/04* (2006.01)
*G01L 1/00* (2006.01)

(52) U.S. Cl.
CPC .............. *G01L 1/044* (2013.01); *G01L 1/048* (2013.01); *G01P 15/18* (2013.01)

(56) References Cited

U.S. PATENT DOCUMENTS

| | | | |
|---|---|---|---|
| 6,003,872 A | 12/1999 | Nord | |
| 6,237,403 B1 | 5/2001 | Oldenettel | |
| 6,672,681 B1 | 1/2004 | Moretti | |
| 6,948,381 B1 * | 9/2005 | Discenzo | G01L 3/12 73/800 |
| 7,307,517 B2 * | 12/2007 | Liu | G01L 3/10 340/441 |
| 8,505,941 B2 * | 8/2013 | Hashimoto | B21D 9/15 280/124.106 |
| 8,720,284 B2 * | 5/2014 | Talikoti | G01P 3/00 73/862.324 |
| 8,966,978 B2 * | 3/2015 | Pannek | B62D 6/10 73/514.02 |
| 9,714,883 B2 * | 7/2017 | Lee | G01N 29/045 |
| 9,958,345 B2 * | 5/2018 | Ichikawa | G01L 3/108 |
| 9,960,641 B2 * | 5/2018 | Ichikawa | G01L 3/101 |
| 2002/0051593 A1 | 5/2002 | Oka | |
| 2003/0042890 A1 | 3/2003 | Normann | |
| 2006/0006601 A1 | 1/2006 | Hufnagel | |
| 2006/0250228 A1 | 11/2006 | Mori | |
| 2007/0059857 A1 | 3/2007 | Sooriakumar | |
| 2009/0315267 A1 | 12/2009 | Castleman | |
| 2009/0317028 A1 | 12/2009 | Castleman | |
| 2010/0010770 A1 | 1/2010 | Helck | |
| 2010/0039381 A1 | 2/2010 | Cretella, Jr. | |
| 2010/0074567 A1 | 3/2010 | Giordana | |
| 2010/0135604 A1 | 6/2010 | Ozaki | |
| 2010/0307218 A1 * | 12/2010 | Meuter | G01L 3/108 73/1.09 |
| 2011/0103690 A1 | 5/2011 | Napper | |
| 2012/0042727 A1 | 2/2012 | Egedal | |
| 2012/0210791 A1 | 8/2012 | Pannek | |
| 2013/0030842 A1 | 1/2013 | Lutgen et al. | |
| 2013/0305842 A1 | 11/2013 | Meuter | |
| 2014/0049008 A1 | 2/2014 | Ziegler | |
| 2015/0273325 A1 | 10/2015 | Raic | |
| 2016/0123470 A1 | 5/2016 | Glaentz | |
| 2017/0030804 A1 | 2/2017 | De Wit | |
| 2017/0322095 A1 | 11/2017 | Lang | |
| 2018/0149205 A1 | 5/2018 | Den Haak | |
| 2018/0266265 A1 | 9/2018 | Gerbi | |
| 2018/0283557 A1 | 10/2018 | Lang | |

FOREIGN PATENT DOCUMENTS

| | | |
|---|---|---|
| CN | 1414349 A | 4/2003 |
| CN | 1723385 A | 1/2006 |
| CN | 1748091 A | 3/2006 |
| CN | 1853061 A | 10/2006 |
| CN | 101166912 A | 4/2008 |
| CN | 101175926 A | 5/2008 |
| CN | 101238302 A | 8/2008 |
| CN | 101292090 A | 10/2008 |
| CN | 101326431 A | 12/2008 |
| CN | 101400979 A | 4/2009 |
| CN | 102036869 A | 4/2011 |
| CN | 103097755 A | 5/2013 |
| DE | 102006060382 A1 | 6/2008 |
| DE | 102013208209 A1 | 11/2014 |
| EP | 0517082 A2 | 12/1992 |
| JP | 2006300702 A | 11/2006 |
| JP | 2009236821 A | 10/2009 |
| JP | 2012149716 A | 8/2012 |
| JP | 2012179928 A | 9/2012 |
| WO | 8304436 A1 | 12/1983 |
| WO | 2011069519 A1 | 6/2011 |
| WO | 2012098980 A1 | 7/2012 |
| WO | 2013000865 A1 | 1/2013 |
| WO | 2013104426 A1 | 7/2013 |

\* cited by examiner

LOAD MEASUREMENT DEVICE AND METHOD FOR DETERMINING LOAD

CROSS REFERENCE

This is a United States National Stage Application claiming the benefit of International Application Number PCT/EP2015/077319 filed on Nov. 23, 2015, which claims the benefit of British Patent Application 1421050.4 filed on Nov. 27, 2014, both of which are incorporated herein by reference in their entireties.

BACKGROUND OF THE INVENTION

It is known to measure a load acting on a deformable component using a piezo sensor attached to a first portion of the component. A deformation of the component induces stress in the piezo element and the stress leads to a detectable voltage. The transfer of stress requires at least two attachment points of the piezo sensor and the inevitable mechanical contact is susceptible to damages and may influence the results of the measurement.

Highly miniaturized 3D acceleration sensors are known from the field of telecommunication. State-of-the art 3D-acceleration sensors may have an angular resolution of 0.1 degrees or below.

US2012/0210791A1 discloses a torque measuring device with acceleration sensors attached to the ends of a torque bar, respectively. A further torque measuring device using acceleration sensors is disclosed in US2013/030842A2.

SUMMARY OF THE INVENTION

The invention seeks to provide an alternative load measurement device requiring only one point of contact to a deformable component.

The invention relates to a load measuring device including a deformable component configured to be deformed under a load to be measured and a sensor assembly to a first portion of said deformable component.

It is proposed that the sensor assembly includes at least one acceleration sensor configured to detect a change in an orientation of said first portion with regard to the direction of gravity. The deformable component is a seal to be in sliding contact with a component configured to rotate in relation to the seal.

In a preferred embodiment of the invention, said acceleration sensor is formed as a semiconductor based 3-axis acceleration sensor.

In applications where an apparatus including the deformable component may change its orientation with regard to the gravity direction as a whole, it may be necessary to calibrate the sensor signals. In this case, the sensor assembly preferably includes at least two acceleration sensors attached to different portions of said component. A data processing device configured to evaluate the sensor signals and to calculate the load based thereon may determine the difference between the orientations of the acceleration sensors in order to discount a rotation or displacement of the deformable component.

According the invention, the deformable component is formed as a bearing seal. It has turned out that in particular in the case of large-size bearings, the orientation of certain portions of a sealing lip may change in response to radial or axial loads acting on the bearing in an amount sufficient to be detected.

In preferred embodiments of the invention, the load measuring device includes a data processing device configured to calculate a load acting on the deformable component based on the signals obtained from the sensor assembly. The data processing device may use e.g a characteristic determined using test loads and stored in a memory device.

A further aspect of the invention prelates to a method for determining a load acting on a deformable component using a load measurement device as described above. In the method according to the invention, the load is determined using signals of an acceleration sensor, wherein said acceleration sensor is attached to a first portion of said component in order to detect a change in an orientation of said first portion with regard to the direction of gravity.

In the context of the invention, the expression load is to be construed broadly as covering static load, dynamic load, linear load, shear load or torque load in the context of the invention.

The above embodiments of the invention as well as the appended claims and figures show multiple characterizing features of the invention in specific combinations. The skilled person will easily be able to consider further combinations or sub-combinations of these features in order to adapt the invention as defined in the claims to his specific needs.

DETAILED DESCRIPTION OF THE EMBODIMENTS

Figure 1:
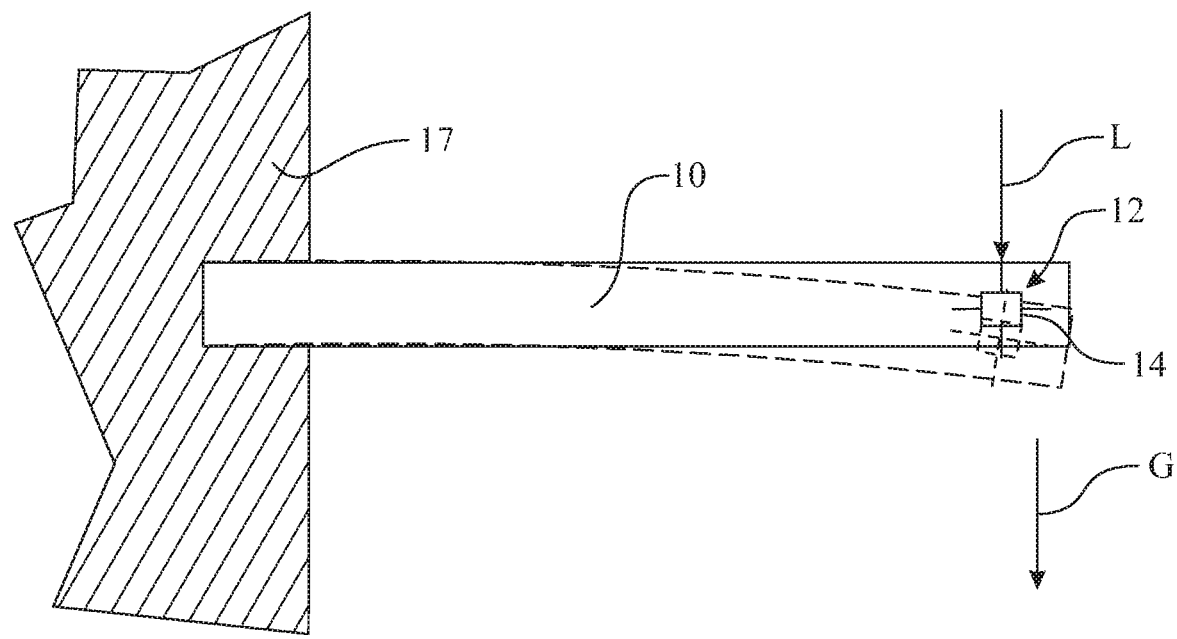
FIG. 1 is a schematic illustration of a load measurement device related to the invention.

FIG. 1 is a schematic illustration of a load measurement device related to the invention.

The load measuring device according to FIG. 1 includes a deformable component 10 formed as a bar configured to be deformed under a load L to be measured. The bar 10 is fixed to a support 17 on one of its ends, is oriented horizontally, i.e. perpendicular to the direction of gravity G, and is configured to support the load L on the other one of its ends.

A sensor assembly 12 including an acceleration sensor 14, more specifically a 3-axis acceleration sensor, is attached to a first portion close to a free end of the deformable component 10. The acceleration sensor 14 can be a gyro sensor, enabling measurements in a linear direction as well as measurements of rotation or angular momentum. The acceleration sensor 14 is configured to detect a change in an orientation of said first portion with regard to the direction of gravity G.

In applications where an apparatus including the deformable component 10 may change its orientation with regard to the gravity direction G as a whole, such as in vehicles running up and down slopes, it may be necessary to calibrate the sensor signals. In this case, the sensor assembly 12 may be provided with at least two acceleration sensors 14a, 14b attached to different portions of said component. A data processing device 16 configured to evaluate the sensor signals and to calculate the load based thereon may determine the difference between the orientations of the acceleration sensors 14 in order to discount a rotation or displacement of the deformable component 10.

Figure 2:
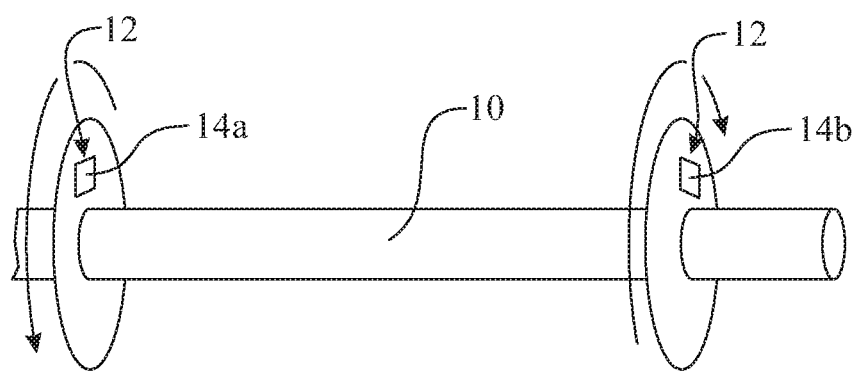
FIG. 2 is a schematic illustration of a load measurement device related to the invention including a torque bar.

FIG. 2 illustrates a related device where the deformable component 10 is a torque bar. Two acceleration sensors 14a, 14b are attached to opposite ends of the torque bar 10 and measure a difference in the relative orientation of the acceleration sensors 14 as a consequence of a twisting of the torque bar 10.

Figure 3:
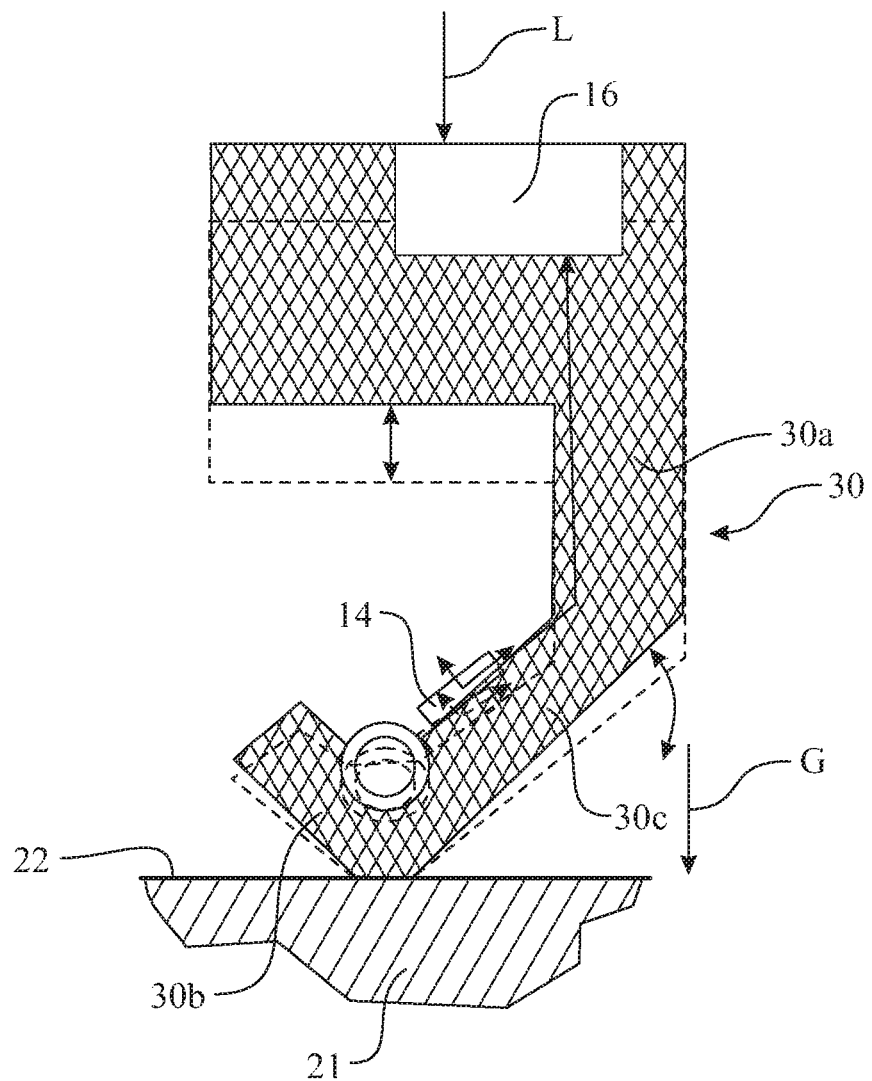
FIG. 3 is a schematic illustration of a bearing equipped with a load measurement device according to a third embodiment of the invention.

FIG. 3 illustrates third embodiment of the invention wherein the deformable component is formed as a bearing seal 30, preferably attached to an outer ring of a bearing. The bearing seal 30 has a profile with an inclined portion 30c connecting a fixing portion 30a of the seal supported by a metallic flange 22 with a contact portion 30b of the bearing seal 30, wherein the contact portion 30b is in sliding contact with an inner ring 20 of the bearing. In further embodiments of the invention, the bearing seal 30 might be in sliding contact with a rotating shaft 21 or the bearing seal 30 might be attached to an inner ring of the bearing.

High radial loads acting on the bearing may lead to a deformation of the bearing rings and/or to a redistribution of the roller elements of the bearing such that the radial distance between the rings of the bearing in the main load direction depends on the radial load. The orientation of the inclined portion 30c of the sealing lip in space will therefore change in response to radial or axial loads acting on the bearing in an amount sufficient to be detected.

Though only illustrated in the embodiment of FIG. 3, the load measuring device may include a data processing device 16 configured to calculate a load acting on the deformable component 10, 30 based on the signals obtained from the sensor assembly 12. The data processing device 16 may use e.g. a characteristic determined using test loads and stored in a memory device.

The above embodiment of the invention relates to a method for determining a load acting on a deformable component 10, 30 using a load measurement device as described above. In the method according to the invention, the load is determined using signals of one acceleration sensor 14 or multiple acceleration sensors 14, wherein said at least one acceleration sensor 14 is attached to a first portion of said component in order to detect a change in an orientation of said first portion with regard to the direction of gravity G.

REFERENCE ELEMENT DESCRIPTIONS

Ref No. Description
G gravity direction
L load
10 deformable component (torque bar)
12 sensor assembly
14 acceleration sensor (including a gyro sensor)
14a acceleration sensor
14b acceleration sensor
16 data processing device
17 support
20 inner ring
21 rotating shaft
22 metallic flange
30 bearing seal
30a fixing portion
30b contact portion
30c inclined portion

The invention claimed is:

1. A load measuring device including:
   a deformable component configured to be deformed under a load to be measured; and
   a sensor assembly attached to a first portion of the deformable component, the sensor assembly including at least one acceleration sensor configured to detect a change in an orientation of the first portion with regard to the direction of gravity, and
   wherein the deformable component is formed as a seal; wherein when installed, the deformable component is in sliding contact with a rotating component, wherein the rotating component rotates in relation to the seal.

2. The load measuring device according to claim 1, wherein the seal has a profile with an inclined portion connecting a fixing portion of the seal supported by a metallic flange with a contact portion of the seal.

3. The load measuring device according to claim 1, wherein the component configured to rotate in relation to the seal is an inner ring of a bearing.

4. The load measuring device according to claim 1, wherein the component configured to rotate in relation to the seal is a rotating shaft.

5. The load measuring device according to claim 1, wherein the acceleration sensor is formed as a semiconductor based 3-axis acceleration sensor.

6. The load measuring device according to claim 1, wherein the sensor assembly includes at least two acceleration sensors attached to different portions of the component.

7. A load measuring system comprising the load measuring device according 6, further comprising a data processing device in communication with the sensor configured to calculate the load acting on the deformable component.

8. The load measuring device according to claim 1, further comprising a data processing device configured to calculate a load acting on the deformable component based on the signals obtained from the sensor assembly.

9. A method for determining a load acting on a deformable component the method comprising the steps of:
   using signals of an acceleration sensor to determine the load,
   attaching the acceleration sensor attached to a first portion of the component in order to detect a change in an orientation of the first portion with regard to the direction of gravity,
   wherein the deformable component is formed as a seal and placed in sliding contact with a rotating component, wherein the rotating component rotates in relation to the seal.

10. A load measuring device including:
    a deformable component configured to be deformed under a load to be measured; and
    a sensor assembly attached to a first portion of the deformable component, the sensor assembly including at least two acceleration sensors configured to detect a change in an orientation of the first portion with regard to the direction of gravity, and
    wherein the deformable component is formed as a seal, wherein when installed, the deformable component is in sliding contact with a rotating component, wherein the rotating component rotates in relation to the seal,
    wherein the deformable component is a torque bar, and wherein the at least two acceleration sensors are attached to opposite ends of the torque bar.

11. A load measuring system, comprising:
    a deformable component configured to be deformed under a load to be measured,
    a sensor assembly attached to a first portion of the deformable component, the sensor assembly including at least one acceleration sensor configured to detect a change in an orientation of the first portion with regard to the direction of gravity, wherein the deformable component is formed as a seal, wherein when installed, the deformable component is in sliding contact with a rotating component, wherein the rotating component rotates in relation to the seal, and a data processing device in communication with the sensor configured to calculate the load acting on the deformable component, the data processing device being configured to recalibrate the sensor when the sensor detects a change in position of the sensor with respect to the direction of gravity.

* * * * *